(12) United States Patent
Al-Faqeer

(10) Patent No.: US 8,192,528 B2
(45) Date of Patent: Jun. 5, 2012

(54) METHOD FOR REMOVING MERCURY FROM NATURAL GAS

(75) Inventor: Faisal M. Al-Faqeer, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 720 days.

(21) Appl. No.: 12/291,883

(22) Filed: Nov. 14, 2008

(65) Prior Publication Data

US 2009/0071073 A1    Mar. 19, 2009

Related U.S. Application Data

(62) Division of application No. 11/409,472, filed on Apr. 21, 2006, now Pat. No. 7,476,365.

(51) Int. Cl.
*B01D 53/02* (2006.01)

(52) U.S. Cl. ............ 95/134; 95/267; 423/228; 423/235; 210/767; 208/251 R

(58) Field of Classification Search .............. 208/251 R; 95/92, 134, 267; 423/210, 232, 220, 228, 423/235; 210/767
See application file for complete search history.

(56) References Cited

U.S. PATENT DOCUMENTS

| | | | |
|---|---|---|---|
| 473,013 A | 4/1892 | Moore | |
| 535,611 A | 3/1895 | Bougher | |
| 548,458 A | 10/1895 | Reynolds | |
| 913,000 A | 2/1909 | Embree | |
| 2,348,357 A | 5/1944 | Parks | |
| 2,488,841 A | 11/1949 | Werts | |
| 2,701,620 A | 2/1955 | Crawford | |
| 2,710,071 A | 6/1955 | Kinser et al. | |
| 2,805,774 A | 9/1957 | Griswold | |
| 2,845,947 A | 8/1958 | Griswold | |
| 2,872,936 A | 2/1959 | Richardson | |
| 2,984,360 A | 5/1961 | Smith | |
| 2,990,691 A | 7/1961 | Glasgow | |
| 3,105,855 A | 10/1963 | Meyers | |
| 3,857,704 A | 12/1974 | Coulter | |
| 4,070,165 A | 1/1978 | Colton | |
| 4,073,734 A | 2/1978 | Lowrie | |
| 4,709,118 A | 11/1987 | Yan | |

(Continued)

OTHER PUBLICATIONS

PONGSIRI, "Initiatives on Mercury," in SPE Prod. & Facilities 14 (1), Feb. 1999.

(Continued)

*Primary Examiner* — Nina Bhat
(74) *Attorney, Agent, or Firm* — Abelman, Frayne & Schwab

(57) ABSTRACT

A method and apparatus for separating mercury and other undesired constituents from a natural gas stream includes passing the raw gas stream sequentially through a first separator, an amine treatment unit, a cooler, a second separator, a dehydrator, a cooler and a third separator. The first separator receives the natural gas stream and separates hydrocarbon and water condensates from the stream; the amine treatment unit removes acid gases; the cooler reduces the temperature of the gas stream to condense additional hydrocarbons and water that are removed by the second separator; and the dehydrator removes water vapor. Next, the temperature of the stream is reduced by the second cooler to condense the mercury and any remaining hydrocarbon vapors. The third separator includes a vessel having a gas inlet and outlet for discharging processed gas, a deflector disposed proximate the inlet for deflecting mercury and other condensates in the gas stream and a mercury trap disposed at the bottom of the vessel to collect the mercury.

16 Claims, 1 Drawing Sheet

U.S. PATENT DOCUMENTS

| | | | |
|---|---|---|---|
| 4,968,332 | A | 11/1990 | Maher |
| 4,981,577 | A | 1/1991 | Audeh et al. |
| 4,982,050 | A | 1/1991 | Gammie et al. |
| 4,983,277 | A * | 1/1991 | Audeh et al. ................. 208/252 |
| 5,096,673 | A * | 3/1992 | Gammie et al. ............. 422/198 |
| 5,205,310 | A | 4/1993 | Kolpak et al. |
| 5,281,258 | A | 1/1994 | Markovs |
| 5,354,357 | A | 10/1994 | Markovs et al. |
| 5,384,040 | A | 1/1995 | Mank et al. |
| 5,409,522 | A | 4/1995 | Durham et al. |
| 5,419,884 | A | 5/1995 | Weekman et al. |
| 5,989,506 | A | 11/1999 | Markovs |
| 6,168,768 | B1 * | 1/2001 | Alexion et al. ............... 423/210 |
| 6,268,543 | B1 | 7/2001 | Sakai et al. |
| 6,350,372 | B1 | 2/2002 | Degnan et al. |
| 6,409,808 | B1 | 6/2002 | Chamberlain et al. |
| 6,475,451 | B1 | 11/2002 | Leppin et al. |
| 6,537,443 | B1 | 3/2003 | Frankiewicz et al. |
| 6,576,092 | B2 | 6/2003 | Granite et al. |
| 6,692,711 | B1 | 2/2004 | Alexion et al. |
| 6,743,829 | B2 | 6/2004 | Fischer-Calderon et al. |
| 6,770,119 | B2 | 8/2004 | Harada et al. |
| 7,396,972 | B2 * | 7/2008 | Van Egmond et al. ....... 585/640 |
| 2004/0083888 | A1 | 5/2004 | Qualls |

OTHER PUBLICATIONS

Charlton et al., "Mercury Contamination at Gas Industry Sites," in SPE/EPA Exploration & Production Environmental Confrerence, San Antonio, Texas, Mar. 7-10, 1993.

Gijselman, P.B., "Presence of Mercury in Natural Gas," in the First International Conference on Health, Safety and Environment, The Hague, Netherlands, Nov. 10-14, 1991.

Wilhelm et al., "Removal and Treatment of Mercury Contamination . . .," SPE/EPA Exploration & Production Environmental Conference, Houston, Texas, Mar. 27-29, 1995.

* cited by examiner

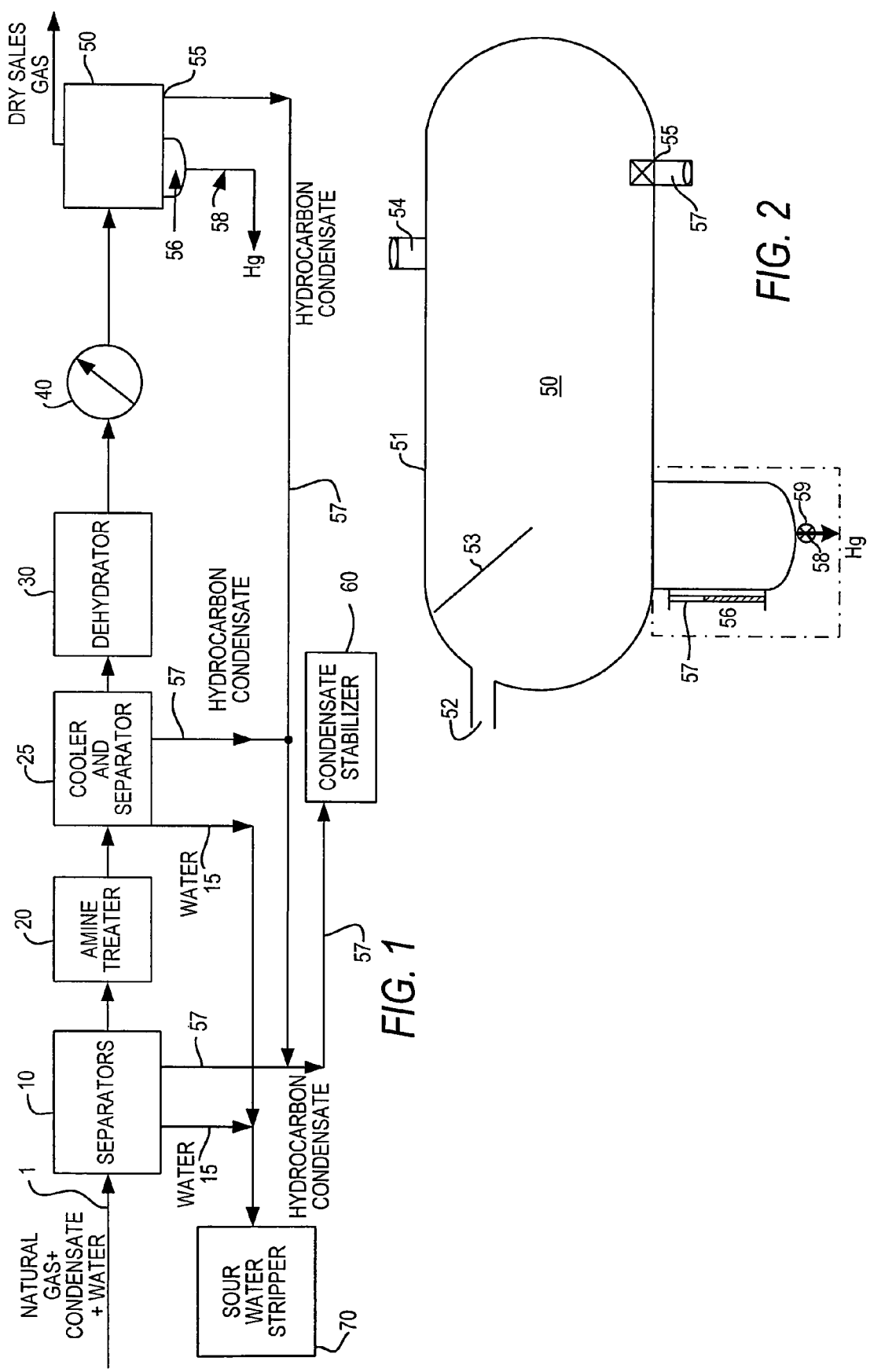

METHOD FOR REMOVING MERCURY FROM NATURAL GAS

CROSS-REFERENCES TO RELATED APPLICATIONS

This application is a division of prior application Ser. No. 11/409,472, filed Apr. 21, 2006, now U.S. Pat. No. 7,476,365, the disclosure of which is incorporated herein by reference in its entirety.

FIELD OF THE INVENTION

The present invention relates to the purification of natural gas, and specifically, an apparatus and method for removing mercury from a stream of raw natural gas.

BACKGROUND OF THE INVENTION

Raw natural gas pumped of discharged from a well is not suitable for use by consumers because of the impurities that it contains. Various commercial processes have been developed for treating and separating impurities and other undesirable constituents from raw natural gas streams in order to produce consumer gas. Raw natural gas usually contains some level of mercury requiring removal treatment. Since mercury left on processing equipment affects downstream processing, it is highly desirable to remove mercury from the natural gas stream at an early stage. As used herein, the terms consumer gas and sales gas means natural gas that is substantially free of undesirable constituents.

U.S. Pat. No. 4,073,734 to Lowrie, entitled "Marine Separator" discloses a single horizontal separator of produced fluids from oil wells that are mainly water, oil and gas. The separator is used for oil wells and includes many internal conduits and adjustable extensions. These complicated structures make it difficult to separate the mercury and liquid hydrocarbons from the gas. Furthermore, in the natural gas application, little liquid will be formed upon chilling the natural gas to 20 F. Lowrie does not provide separators for removing mercury.

U.S. Pat. No. 4,968,332 to Maher, entitled "Separator Unit", discloses a separation of oil and salt water from natural gas at a well head. The separator unit prevents oil and/or salt water from discharging into the surrounding natural environment of high pressure, high velocity of stream during venting of a natural gas well head. Thus, even if mercury exists in the natural gas, it will not condense at the well head temperature and it will be present in the gas phase. It may also exist in an organic form dissolved in the liquid hydrocarbon, which can not be separated by gravity.

U.S. Pat. No. 6,409,808 to Chamberlain, et al., entitled "Separators", discloses a gravity separator for separating oil, water, and gas from raw oil using gravity to form vertically discrete oil and water layers. A cyclone is used to break the emulsion from the crude oil and thereby separate water and gases from the oil. Chamberlain, et al. does not provide a way to separate mercury from gas.

U.S. Pat. No. 2,701,620 to Crawford, entitled "Oil, Gas, and Water Separator", is directed to a separator for removing excess free water from the oil, gas and water as produced from the well. The separator maintains the desired pressure on the oil or water so that it may be discharged at any elevation within the range of pressure applied to the fluid in the vessel. Thus, the separator removes sludge and emulsion present in the crude oil. The separator has a complex structure that is required to separate sludge and emulsion, but would be ineffective for separating mercury.

U.S. Pat. No. 2,710,071 to Kinser, et al., entitled "Horizontal Separator for Mixed Fluids" discloses a horizontal separator for separating mixtures of gas, oil and water discharged from a producing well. The separator has upper and lower vessels disposed horizontally. However, this separator cannot be used for separating mercury, because mercury will accumulate throughout the vessel and the scrubbers will aggravate the problem of mercury contamination, which will make its cleaning and removal from the vessel a challenge. In addition, the mercury level in natural gas is typically not high enough to travel from the top to the lower portion and then to the sump.

U.S. Pat. No. 2,984,360 to Smith, et al., entitled "Multipurpose Separator", discloses a separator that can be used with any liquids and gas. However, this apparatus can not be used for mercury. Mercury is toxic and has a health and safety impact on people entering the vessel during shutdowns for maintenance or inspections. If the multipurpose separator were to be used for separating mercury, the mercury-contaminated area would extend to the entire lower portion of the vessel, which would require cleaning before entry of personnel to inspect or perform maintenance activities, thereby rendering it unpractical and expensive to operate.

U.S. Pat. No. 4,982,050 to Gammie, et al., entitled "Natural Gas Treating System Including Mercury Trap", discloses a method and apparatus for removing mercury that is present in natural gas. The mercury traps described are to be used when mercury removal units have been used upstream at the inlet of the plant, which indicates a very low mercury content in the gas afterward. The mercury removal units can remove up to 0.01 micrograms per cubic meter of mercury from natural gas, which makes further condensation of mercury impossible. In addition, the traps will remove all condensed materials, including liquid hydrocarbons and mercury. It is not economically practical or environmentally acceptable to remove and discard liquid hydrocarbons with the mercury as a waste stream.

There is, therefore, a need in the art for an efficient and cost effective method and apparatus for selectively separating mercury from a natural gas stream.

There is also a need for a continuous separation method and apparatus that can remove mercury that may be present at any level or concentration in a natural gas stream.

SUMMARY OF THE INVENTION

The deficiencies of the prior art are overcome, and other advantages are achieved by the separation method and apparatus of the present invention for separating mercury from a natural gas stream that includes a first separator, an amine treatment unit, a cooler, a second separator, a dehydrator, a cooler and a third separator. The first separator receives the mercury-containing natural gas that includes hydrocarbon condensate and water. It separates the hydrocarbon condensate and water from the natural gas. The amine treatment unit removes acid gases from the natural gas. The natural gas is then cooled to condense additional hydrocarbons and water that is removed in the second separator. The dehydrator removes any remaining water using triethylene glycol TEG). The cooler reduces the temperature of the gas stream to a predetermined dew point temperature to condense remaining hydrocarbons and mercury vapors into droplets that are carried by the moving stream to the third separator.

The third separator removes mercury from the natural gas stream. The third separator includes a vessel with at least one inlet for receiving the natural gas stream from the cooler, at least one outlet for discharging the processed gas stream from the vessel, and a mercury trap disposed at the bottom of or below the vessel. The vessel also includes at least one deflector disposed at a position proximate the vessel inlet, in order to provide a surface on which the mercury vapor droplets can collect, coalesce and thereby drop under the effect of gravity from the natural gas stream.

As used herein, the term deflector is intended to include a flat or curved plate that is smooth or textured, as well as baffles and complex shapes that serve to reduce the velocity of the liquid droplets and to direct the drops and/or coalesced stream(s) to move under the influence of gravity to the bottom surface of the vessel and collect the mercury in the trap that is positioned there.

In another aspect, a separator for separating mercury from a gas stream comprises a vessel having an inlet through which the gas stream enters a gas stream outlet. The vessel includes a deflector axially disposed at a position adapted to deflect the gas stream flowing from the inlet and a trap secured to, and passing through a wall at the bottom of the vessel below the deflector. The deflector reduces the velocity of the mercury vapor particles and allows them to coalesce to form larger drops and settle to the bottom of the vessel under the influence of gravity. The liquid mercury flows to the trap where it is separated from the moving gas stream and the other condensate materials that have settled to the bottom of the vessel according to their respective differences in density. The purified natural gas stream from which mercury and condensed hydrocarbon materials have been removed, flows out of the vessel through the gas discharge outlet.

The separator constructed and operated in accordance with the present invention selectively separates mercury from a moving gas stream and associated condensed hydrocarbons in a convenient and inexpensive manner and without employing a complex structure.

BRIEF DESCRIPTION OF THE DRAWINGS

The present invention will be readily understood by considering the following detailed description in conjunction with the accompanying drawings in which:

FIG. 1 is a schematic flowsheet depicting the apparatus and method for processing natural gas for the removal and recovery of mercury in accordance with the present invention; and FIG. 2 is a side view schematically illustrating one preferred embodiment of a separator vessel for separating and recovering mercury in accordance with the process of FIG. 1.

To facilitate an understanding of the invention, the same reference numerals have been used, when appropriate, to designate the same or similar elements that are common to the figures. Unless stated otherwise, the features shown and described in the figures are not drawn to scale, but are shown for illustrative purposes.

DETAILED DESCRIPTION OF THE PREFERRED EMBODIMENTS

Referring to FIG. 1, the apparatus for separating mercury from a natural gas stream 1 includes a first separator 10, an amine treating unit 20, a cooler and separator 25, a dehydrator 30, a cooler 40, a mercury separator 50, a condensate stabilizer 60 and a sour water stripper 70. Each element is operatively connected in sequential fluid communication to the adjacent element by conventional gas transmission ducts and pipes and fitted with conventional fluid flow control means, e.g., valves, and pressure and temperature indicators, e.g., gages.

The natural gas stream to be processed enters the primary separator 10. The natural gas stream at this stage contains a variety of vaporized materials, including hydrocarbons, water and mercury. The separator 10 separates water and hydrocarbon condensate from the natural gas and other materials and sends the water to the sour water stripper 70 and the hydrocarbon condensate to stabilizer 60.

The natural gas flowing out of separator 10 is introduced into the amine treating unit 20 to remove acid gases, such as $CO_2$ and $H_2S$. The amine-treated gas stream is directed to the cooler and separator 25 where it is cooled to condense additional water and hydrocarbons. The condensed materials are removed and the water is directed to the sour water stripper 70 and the hydrocarbons to the condensate stabilizer 60. The gas stream then passed to dehydrator 30 for contact with TEG or other water absorbing material to reduce the water content. The gas stream is cooled in cooler 40 to a predetermined dew point temperature where hydrocarbons as well as mercury in the natural gas will condense. In a preferred embodiment, the temperature is about 20° F. As will be apparent to one of ordinary skill in the art, other conditions, such as pressure, the concentration of mercury and fluid flow paths must be taken into account. With continuing reference to FIG. 1, the apparatus also includes a condensate stabilizer vessel 60 that receives hydrocarbon condensates from each of the separators 10, 25 and 50. Condensed water, which will contain dissolved gases and other contaminants is collected from separators 10 and 25 for treatment in sour water stripper 70, pending disposal.

Referring to FIG. 2, the mercury separator 50 includes a vessel 51, an inlet 52, a deflector plate or baffle 53, a gas outlet 54, a hydrocarbon outlet 55, and a mercury trap 56. The vessel 51 can have a generally cylindrical internal surface with its longitudinal axis in a substantially horizontal position. It will be understood by one of ordinary skill in the art that the shape of the vessel 51 can be varied according to functionality of the elements or other environmental and site conditions.

The vessel inlet 52 is disposed proximate the upper surface 51 of the vessel 50 and enters long the longitudinal axis. The gas outlet 54 is also disposed in the upper surface 51 of the vessel and the condensed hydrocarbon outlet 55 is disposed in or below a lower surface at the bottom of the vessel 50. The deflector 53 is mounted proximate the inlet 52, preferably at an angle to the gas fluid flow. The shape, size and optimum placement position and angle of the deflector 53 is determined to maximize the removal of mercury based upon the gas flow rate and the physical parameters of the vessel 51.

The mercury trap 56 is positioned at the bottom of the vessel 51 below the deflector 53. It will be understood that liquid mercury and condensed hydrocarbons will accumulate in mercury trap 56, with the higher density mercury settling to the bottom of the trap. A sight-gage 57 or other level indicator can be employed to indicate the amount of mercury in the trap. The condensed hydrocarbons will be displaced by the incoming mercury and flow along the bottom of vessel 50 to condensate outlet 55 which is downwardly disposed and connected to conduit 57.

Accumulated mercury can be removed from the trap 56 periodically by automated control means or as part of scheduled maintenance, using valve 59. It will be understood that the mercury should not be permitted to flow out of the trap 56 to mix with hydrocarbon condensates in line 57.

The natural gas going through hydrocarbon condensation at the cooler 40 flows into the vessel 51 through the inlet 52.

The vessel 51 is adapted to have a low space velocity to aid in separating all condensed liquids from the gas stream. Reducing space velocity of the gas stream will allow the liquids enough time to settle out of the gas by gravity.

The gas flowing through the inlet 52 is deflected by the deflector 53. The deflector 53 may be a plate, a blade, or a series of baffles. The deflector 53 is positioned at an angle to the longitudinal axis of the vessel 51, such that condensate materials and mercury impacting the deflector's surface drop into the vessel below the deflector 53. The condensed hydrocarbon materials and mercury deflected by the deflector 53 flow to the mercury trap 56 that is positioned below the deflector 53.

Mercury settles at the bottom of the trap 56, with condensed hydrocarbon materials above due to their density differences. This difference in density between mercury and any other lighter condensate materials, in combination with the configurations of the deflector 53 and the trap 56, allows selective removal of mercury from the natural gas and condensed hydrocarbons produced by the cooler 40, since the mercury will pass through the upper layer of lighter condensed materials and can be withdrawn from the lower region of the trap 56.

Mercury settling in the trap 56 is removed periodically or continuously, depending upon the rate of mercury accumulation and size of the trap. Condensate materials flow on the bottom of the vessel 51 and can be removed thorough the hydrocarbon outlet 55 that is disposed at the bottom of the vessel 51. The separated hydrocarbon condensate is sent back to the condensate stabilizer 60. An interface level transmitter (not shown) may be used to control the level of mercury in the mercury trap 56 to insure that hydrocarbons do not to leave the separator 50 with the mercury. The gas after condensate materials and mercury are separated will go out of the vessel 51 thorough the gas outlet 54. Therefore, dry acid-free gas appropriate for consumer use is produced by the apparatus and method of the invention, and can be shipped to storage or admitted to consumer transmission pipelines.

Although the present invention has been described with reference to a separator having a particular configuration for separating mercury from a natural gas stream, it should be understood that the apparatus of the present invention can be used in other configurations or designs, as well as in other purification processes.

As will also be apparent to one of ordinary skill in the art, functionally equivalent combinations, as well as individual pieces of apparatus can be substituted for the illustrative embodiment described above. For example, a single cooler or refrigeration unit can be used to effect the various stages of cooling by routing the gas stream to return to a central cooling/refrigeration unit. Cooler and separator 25 can be two separate units, and the dehydrator 30 and downstream cooler 40 can be combined, for example.

Although various embodiments that incorporate the teachings of the present invention have been shown and described in detail herein, those skilled in the art can readily devise other embodiments without departing from these teachings and the scope of the invention is to be determined with reference to the claims that follow.

I claim:

1. A method for producing a consumer gas stream from a raw natural gas stream that contains mercury vapors and other undesired constituents, the method comprising:

separating any water and hydrocarbon condensate that is present from said natural gas stream;

treating said natural gas stream with an amine to remove any acid gases;

dehydrating said natural gas stream;

cooling said natural gas stream to condense the mercury and any remaining hydrocarbons;

providing a separator vessel that includes a fluid inlet and a gas outlet, a deflector proximate the inlet adapted to deflect said natural gas stream passing through said inlet, a mercury trap having a valved outlet, and a hydrocarbon condensate outlet for separately discharging hydrocarbons;

causing said cooled natural gas, mercury and any other condensates to flow through the separator inlet and into contact with said deflector, whereby said condensed mercury settles to the bottom of said mercury trap and said condensates accumulate on the surface of the mercury in the trap, and said hydrocarbon condensates are separately collected via the hydrocarbon condensate outlet; and discharging said treated natural gas stream from the separator vessel outlet as consumer gas.

2. The method of claim 1 in which the mercury passes from the end of the deflector into the in mercury trap positioned below the deflector.

3. The method of claim 2, further comprising the step of monitoring the amount of mercury in the trap with the use of a level indicator.

4. The method of claim 1, wherein the natural gas is cooled to about 20° F.

5. The method of claim 1, wherein the step of dehydrating said natural gas stream includes contacting the gas stream with triethylene glycol (TEG).

6. The method of claim 1, wherein the step of cooling said natural gas stream includes reducing the temperature of the gas stream to a predetermined dew point temperature.

7. The method of claim 6, wherein the predetermined dew point temperature is 20 degrees Fahrenheit.

8. The method of claim 1, further comprising the step of continuously removing the condensed mercury from the trap.

9. The method of claim 1, further comprising the step of periodically removing the condensed mercury from the trap.

10. The method of claim 9, wherein the condensed mercury is periodically removed from the trap by automated control means.

11. The method of claim 1, further comprising the step of controlling the level of condensed mercury in the trap using an interface level transmitter.

12. The method of claim 1 further comprising the step of directing the separated hydrocarbons to a condensate stabilizer.

13. A method for producing a consumer gas stream from a processed natural gas stream that is free from hydrocarbon condensate and acid gases, wherein the natural gas stream contains mercury vapors and other undesired constituents, the method comprising:

dehydrating said natural gas stream;

cooling said natural gas stream to condense the mercury and any hydrocarbon vapors;

providing a separator vessel that includes a fluid inlet and a gas outlet, a deflector proximate the inlet adapted to deflect said natural gas stream passing through said inlet, a mercury trap having a valved outlet, and a hydrocarbon condensate outlet for separately discharging hydrocarbons;

causing said cooled natural gas, mercury and any other condensates to flow through the separator inlet and into contact with said deflector, whereby said condensed mercury settles to the bottom of said mercury trap and said condensates accumulate on the surface of the mercury in the trap, and said hydrocarbon condensates are separately collected via the hydrocarbon condensate outlet; and discharging said treated natural gas stream from the separator vessel outlet as consumer gas.

14. The method of claim 13 further comprising the step of directing the separated hydrocarbons to a condensate stabilizer.

15. A method for producing a consumer gas stream from a processed, dehydrated natural gas stream that is free from hydrocarbon condensate and acid gases, wherein the natural gas stream contains mercury vapors and other undesired constituents, the method comprising:

cooling said natural gas stream to condense the mercury and any hydrocarbon vapors;

providing a separator vessel that includes a fluid inlet and a gas outlet, a deflector proximate the inlet adapted to deflect said natural gas stream passing through said inlet, a mercury trap having a valved outlet, and a hydrocarbon condensate outlet for separately discharging hydrocarbons;

causing said cooled natural gas, mercury and any other condensates to flow through the separator inlet and into contact with said deflector, whereby said condensed mercury settles to the bottom of said mercury trap and said condensates accumulate on the surface of the mercury in the trap, and said hydrocarbon condensates are separately collected via the hydrocarbon condensate outlet; and discharging said treated natural gas stream from the separator vessel outlet as consumer gas.

16. The method of claim 15 further comprising the step of directing the separated hydrocarbons to a condensate stabilizer.

* * * * *